United States Patent Office 3,730,797
Patented May 1, 1973

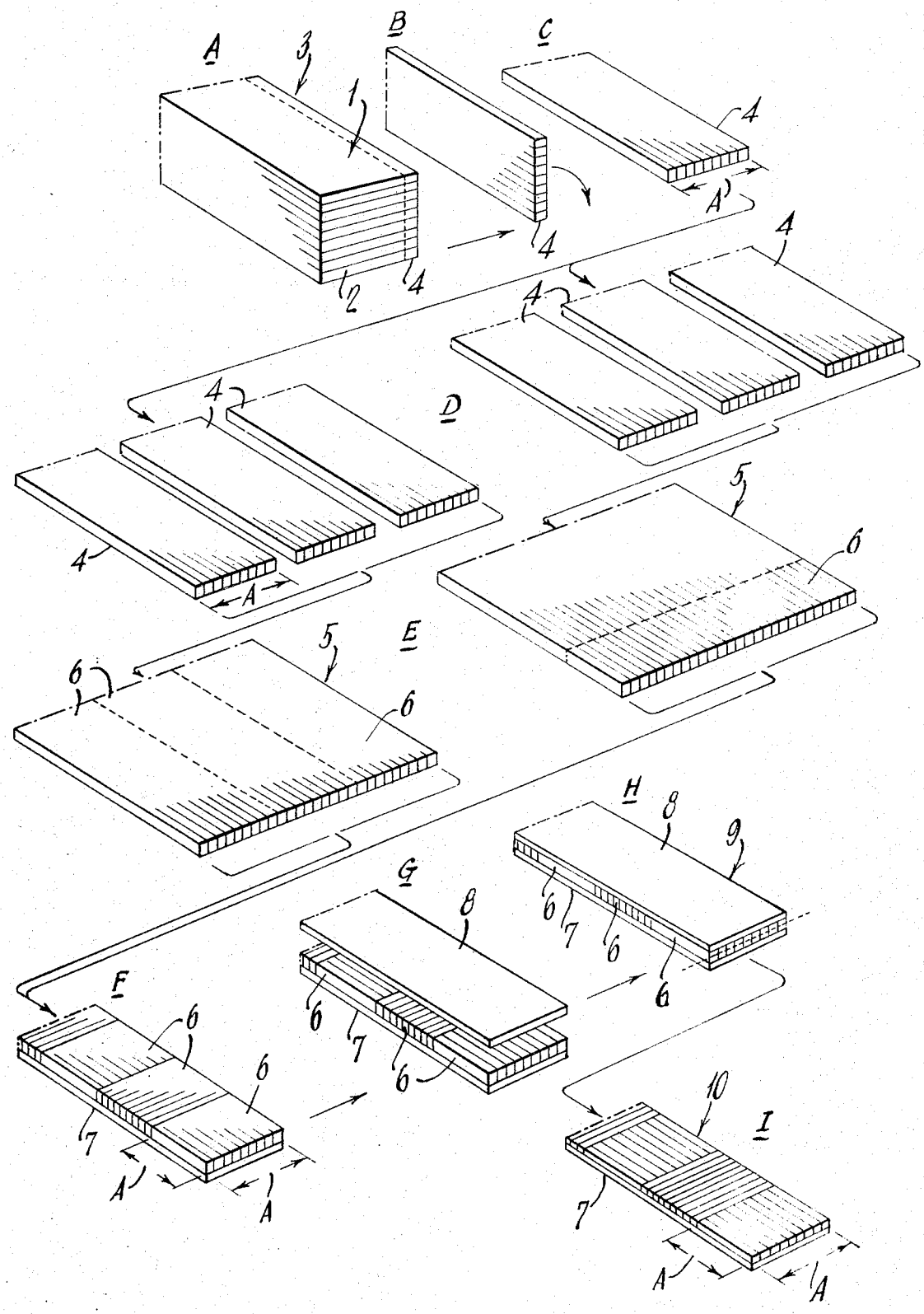

3,730,797
METHOD FOR MANUFACTURING BUILDING BOARDS WITH CHEQUER-SQUARE PATTERN
Olav N. Jensen, Kotka, Finland, assignor to O. Y. Gutzeitin Laatikkotehdas-A.B. Gurzeits Ladfabrik, Kotka, Finland
Filed Mar. 11, 1970, Ser. No. 18,626
The portion of the term of the patent subsequent to June 29, 1988, has been disclaimed
Int. Cl. B32b 31/00
U.S. Cl. 156—182
5 Claims

ABSTRACT OF THE DISCLOSURE

A method of manufacturing chequer-square parquet building boards of unrestricted length. The veneer strips constituting the exposed outer face of a finished parquet board all stand on their narrow faces. The narrow faces are secured to a flat base and the grain in every veneer strip runs parallel to the plane of the base to which the strips are secured. Starting with a stack of veneer sheets having identical grain direction and glued together to form a multilayered board, sticks are cut from the multilayered board and the strips are rotated to form a core board. The core board is cut up into core slabs. The core slabs are glued between flat base plates to form a sandwich and the sandwich is split by a cut through its core into two boards, each of which has a surface of veneer strips standing on their narrow faces.

BACKGROUND OF THE INVENTION

Field of the invention

The present invention relates to a method for manufacturing building boards with chequer-square pattern, e.g. floor, wall or ceiling boards or planks.

Prior art

The classical chequer-square parquet is old and well known. The manufacturing of such chequer-square parquet and the subsequent laying, at the building site, of the small pieces of wood forming the squares in the ultimate product has been highly time-consuming and expensive. These two phases of work do not meet with modern production requirements, with the result that only a few have been able to afford such a parquet in spite of its great advantages as a flooring material in aesthetic as well as practical value. In my prior Pat. No. 3,589,963 I disclosed an economical method for manufacturing building boards having surfaces of parallel veneer strips. It remained desirable to find a method for the economical production of chequer square parquet surfaces.

SUMMARY OF THE INVENTION

According to the present invention building boards with chequer-square pattern are manufactured in unrestricted length by gluing and pressing together in a stack one upon the other a plurality of single veneer sheets manufactured and cut in conventional manner for producing a multilayered board in which the individual veneer courses have identical grain directions. The multilayered board thus obtained is divided into sticks having a width twice the thickness of the surface layer of the final building board to be produced. The sticks are turned through an angle of 90° about their longitudinal axis, and then the sticks are joined to form a core board in which the individual veneer strips stand on their narrow face and at right angles to the plane of the core board. The core board is cut up into quadrangular smaller units, called core slabs, of the same thickness as the core board and having a short edge consistent with one side of the square in the final surface layer and a long edge which is a multiple of the other side of the square in the final surface layer. These core slabs are then placed upon a glue coated base plate one after the other with their long sides meeting and in such manner that the veneer strips in one core slab form an angle with those in the most closely adjacent core slabs. Another base plate is attached to the opposite side of the core slabs to produce a sandwich board composed of three layers. The sandwich board is then cut up into planks having the same width as one side of the square in the final surface layer, and the planks thus obtained are split by a cut passing through the centre of the core board and parallel to the base plates to obtain two mutually antisymmetric building boards, the surface layer of which consists of the veneer strips standing on their narrow face. The building board produced has a chequer-square pattern of veneer strips standing on their narrow faces. The surface of the board is ground and finished as desired.

The object of the invention is to eliminate the drawbacks which have affected the manufacturing of the classical chequer-square parquet, namely, in the first place expensive manufacturing at a factory and, secondly, expensive and time-consuming mounting at the building site. In addition, considerable saving of timber material are achieved by a method according to the invention. A further object of the invention is therefore to render the classical chequer-square parquet affordable to the public at large.

BRIEF DESCRIPTION OF THE DRAWING

The attached drawing schematically indicates the main steps in the manufacture of a chequer-square pattern building board in accordance with the invention.

DESCRIPTION OF THE PREFERRED EMBODIMENTS

The invention shall be explained in the following in connection with the manufacturing of chequer-square parquet planks of birch veneer and referring to the attached drawing. The manufacturing method is equally well suited for manufacturing planks and boards of other wood species. Materials other than veneer, e.g. hard-board, chip boards, laminated wood boards, etc. may be used to form the base.

Simple veneer sheets 1 about 2 mm. in thickness and of normal size are mutually joined in a plane, appropriately by means of bevelled joining ends 2, by gluing them together in previously known manner to form veneer tables of suitable length. A length of 5 m. has thus proved to be particularly appropriate when the manufacturing of floor planking is concerned. These long, single veneer tables are stacked one upon the other in a number of about 12-14 such tables, in which connection a coat of some suitable glue, preferably a water-resistant glue, is applied on both sides of every second veneer table. This multiple veneer is then pressed in a manner previously known in itself, in a press, to form a board 3. The edges of this board are trimmed, and the board is then cut up into planks of about 30 cm. width. These planks are further cut with the aid of a multiple saw or some other appropriate saw having several blades, into sticks 4 of about 20-28 mm. x 18 mm. cross section dimensions. These sticks are then transferred to a composing machine, in which the sticks are joined together to form a so-called core board 5, in which the individual laminated strips stand on their narrow face.

The core boards obtained in this manner are now cut up with an appropriate saw having a minimum of two blades, into quadrangular smaller units, so-called core slabs 6. This sawing is done in a manner resulting in core slabs having a short side consistent with one side of the chequer-square in the finished product and a long side which is a multiple of the other side of the square. The core boards are cut in two different ways to produce two types of core slabs. One type of core slab is formed by cuts directed parallel to the longitudinal direction of the veneer strips in the core board so that the veneer strips run lengthwise in the slab. The other type of core slab is formed by cuts directed perpendicular to the longitudinal direction of the veneer strips in the board, so that such a slab has its veneer strips running crosswise to its length. The two types of slabs both have the same dimensions, but the veener strips in the otherwise similar slabs run in different directions, as shown in the drawing. For producing parquet surface roughly equal numbers of slabs of each type are used. These core slabs are now lined up on a glue-coated base 7 of plywood, blockboard, chipboard, plastic or equivalent in such manner that the core slabs 6 are placed one after the other with their long sides meeting, and the veneer strips in one core slab form an angle with those in adjacent core slabs, slabs of the two different types being laid up alternately on the base. The base may also be composed at this phase of the work in particular if the base is plywood.

Upon the core slabs there is placed or built up a course 8 of the same material as the base and having the same thickness and composition as the base, for balance. The core slabs thus are sandwiched between the bore 7 and the board 8, as shown in the drawing.

It should be particularly noted that at the joining of the veneers the edges should be bevelled, and if in addition the joined veneer sheets are so arranged that the joints in contiguous veneer sheets are not placed immediately close to each other, a product is obtained in which the joints are virtually completely invisible and furthermore, tight enough to prevent any accumulation of dust or other dirt in them.

A further advantage of the procedure described in the foregoing is that at the phase in which the core board 5 is made up the sticks 4 are turned through 90 degrees with reference to the position which they had during press-gluing of the individual veneer strips 1, whereby the abrasion surface of the sticks 4 runs vertically. The finished product, in which the core board forms the exposed surface, thus has greater resistance to wear, as noted in my aforementioned Pat. No. 3,589,963.

This is significant since in the course of this compression the veneer sheets are endowed with a latent reaction force, which successively causes return of the laminated slabs to their original thickness, whereby the joints between contiguous slabs or planks in the completed floor, wall or ceiling will automatically close up.

When water-resistant, hard plastic glues are employed, the glue also penetrates the cells of the wood and constitutes in them a kind of protection against decay, while at the same time the hardness of the floor increases, dependent on the percent proportion of hard plastics in the abrasion surface of the slab, which come from the closely spaced glued joints.

As has been pointed out already, it is very easy to manufacture a chequer-square parquet with the aid of building board manufactured according to the invention. It should be noted that in case at the lining up of core slabs 6 an even number of core slabs was used, the core slabs at the ends of the core board, and thus also the squares at the ends of the completed building board, will have different grain directions. It is thus only necessary when the chequer-square parquet is laid to turn every second building board through 180 degrees in the plane in order so that the squares in contiguous, end-to-end building boards will have different grain directions. If the number of core slabs 6 in the core board is odd, the squares at the ends of the completed building board will be identical of their grain direction. In laying a chequer-square parquet, such building boards are most simply utilized by displacing adjacent building boards by the amount of one square in their longitudinal direction, whereby each two adjoining squares in the completed I chequer-square parquet will have different grain directions.

if a chequer-square parquet with equilateral rectangular squares is desired in which the veneer strips in every second square form an angle of 90 degrees and run parallel to one side in the corresponding square, the core slabs have to be cut so that they are rectangular parallelograms. Furthermore, the veneer strips in about half the number of core slabs shall run parallel to the short side of said core slabs and the veneer strips in the rest of the core slabs shall run parallel to the long sides of these core slabs. As a result, the veneer strips in adjacent core slabs, in which the veneer strips run in different directions and which have been lined up with their long sides meeting, will form an angle of 90 degrees. Finally, the long side of the core slabs 6 shall be an integral multiple $nA$ of their short sides A consistent with the sides in the square which is desired. The three-layered sandwich board 9 is in this case cut up in such manner that planks 10 are obtained which have a width equalling the side of the square in the desired chequer-square parquet.

It is obvious that the core board may also be manufactured of single veneer sheets which have not been joined together in the plane. This is particularly advantageous when the length of the veneer sheet is an integer multiple of the thickness of the core board and when the width of the veneer sheet is an integer multiple of the long side of the core slab, in that the time required for cutting up is considerably reduced.

It is also possible by the method according to the invention to manufacture building boards with squares having oblique angles and in which the veneer strips in adjacent squares form angles other than 90 degrees.

What is claimed is:

1. A method of manufacturing building boards having a surface layer formed of veneer strips with their narrow faces attached to a base, said veneer strips being arranged in groups of side by side strips attached to each other, with the strips of adjacent such groups attached to the same base running in different directions so that the boards have a chequer-square pattern surface, comprising:

(a) stacking one upon another a plurality of single veneer sheets with the direction of the grain in all of the stacked sheets identical and gluing and pressing the sheets together to form a multilayered board;

(b) cuttting said multilayered board with a plurality of equally spaced longitudinal cuts directed parallel to the grain of the veneer sheets to form a plurality of sticks, each stick having a thickness equal to twice the thickness of the surface layer of the board product;

(c) turning said stick through 90° about their longitudinal axis;

(d) then joining pluralities of said sticks side by side to form core boards in which all the individual veneer strips stand on their narrow faces and run at right angles to the plane of a core board surface;

(e) cutting up said core boards into quadrangular core slabs of two different types, the core slabs of both said types each having the same thickness as the core board, a short edge equal in length to the side of a square in the chequer-square pattern of the board product surface, and a long edge which is a multiple of the length of a side of a square in said square pattern, the two ypes of core slabs differing only in that their veneer strips are differently oriented;

(f) placing the core slabs flat upon a glue coated base plate with their long sides meeting, and a alternating core slabs of the two different types so that the veneer strips in one core slab form an angle with respect to the veneer strips of the most closely adjacent core slab;
(g) attaching another base plate to the opposite surface of said core slabs to form a sandwich board compound of three layers;
(h) cutting the sandwich board into blanks having a width equal to a side of a square in the final board product surface;
(i) splitting said planks with a cut passing through the center of the core board and parallel to the base plates to produce two mutually antisymmetric building boards having surface layers consisting of veneer strips standing on their narrow faces in a chequer square pattern.

2. The method of claim 1 in which the cutting of said core boards into core slabs is so performed that the veneer strips in every core slab run parallel to one of the edges of the slab.

3. The method of claim 1 and including using plywood as said base plate and arranging said plywood with its grain direction nearest the core slabs running parallel to the surface of the final board product.

4. The method of claim 1 and including using wood of the same species for the veneer and for the base plates, said base plates having a thickness at least equal to the thickness of the surface layer of the final board product.

5. The method of claim 1 and including preparing said single veneer sheets by joining veneers edge to edge with beveled joints, and stacking said veener sheets so that such joints in superposed veneer sheets are staggered.

References Cited

UNITED STATES PATENTS

| | | | |
|---|---|---|---|
| 3,041,231 | 6/1962 | Fountain | 156—254 |
| 2,062,590 | 12/1936 | Lundquist | 161—36 X |

FOREIGN PATENTS

| | | | |
|---|---|---|---|
| 275,527 | 8/1951 | Switzerland | 52—384 |

CARL D. QUARFORTH, Primary Examiner

R. E. SCHAFER, Assistant Examiner

U.S. Cl. X.R.

52—390; 156—254, 264, 246, 299; 161—60

UNITED STATES PATENT OFFICE
CERTIFICATE OF CORRECTION

Patent No. 3,730,797  Dated May 1, 1973

Inventor(s) OLAV N. JENSEN

It is certified that error appears in the above-identified patent and that said Letters Patent are hereby corrected as shown below:

| | | |
|---|---|---|
| Col. 1, | lines 5 and 6, | the name of the Assignee should read:<br>--O. Y. Gutzeitin Laatikkotehdas - A. B. Gutzeits Lådfabrik--. |
| Col. 3, | line 2, | after "square." and before "The" insert:<br>--In the drawing, the short side is of the dimension "A".-- |
| Col. 4, | line 3, | delete "I". |
| | line 5, | capitalize "if". |
| | line 23, | after "parquet." insert:<br>--In the embodiment illustrated in the drawing the core slabs 6 have been shown cut with squares before placement on the base 7 for simplicity.-- |
| | line 69, | "ypes" should read --types--. |
| | line 73, | delete "a". |

Signed and sealed this 10th day of December 1974.

(SEAL)
Attest:

McCOY M. GIBSON JR.
Attesting Officer

C. MARSHALL DANN
Commissioner of Patents